United States Patent
Yuge et al.

(10) Patent No.: US 8,093,174 B2
(45) Date of Patent: Jan. 10, 2012

(54) CATALYST-SUPPORTING CARBON NANOHORN COMPOSITE AND PROCESS FOR PRODUCING SAME

(75) Inventors: Ryota Yuge, Tokyo (JP); Masako Yudasaka, Tokyo (JP); Sumio Iijima, Tokyo (JP)

(73) Assignee: NEC Corporation, Tokyo (JP)

( * ) Notice: Subject to any disclaimer, the term of this patent is extended or adjusted under 35 U.S.C. 154(b) by 193 days.

(21) Appl. No.: 12/524,057

(22) PCT Filed: Jan. 16, 2008

(86) PCT No.: PCT/JP2008/000031
§ 371 (c)(1),
(2), (4) Date: Jul. 22, 2009

(87) PCT Pub. No.: WO2008/090728
PCT Pub. Date: Jul. 31, 2008

(65) Prior Publication Data
US 2010/0099551 A1    Apr. 22, 2010

(30) Foreign Application Priority Data

Jan. 25, 2007  (JP) .................. 2007-014507

(51) Int. Cl.
*B01J 21/18* (2006.01)
*D01F 9/12* (2006.01)
*D01C 5/00* (2006.01)
*B32B 9/00* (2006.01)
*D02G 3/00* (2006.01)

(52) U.S. Cl. ............ 502/180; 423/447.1; 423/447.2; 423/447.3; 423/445 B; 977/742; 977/743; 977/744; 977/745; 977/746; 977/747; 977/748; 977/749; 977/750; 977/751; 977/752; 977/753; 977/754; 977/842; 977/843; 977/844; 977/845; 977/846; 977/847; 977/848; 428/367

(58) Field of Classification Search .......... 502/180; 423/447.1–447.3, 445 B; 977/742–754, 977/842–848; 428/367
See application file for complete search history.

(56) References Cited

U.S. PATENT DOCUMENTS

| | | | |
|---|---|---|---|
| 2004/0048744 A1 | 3/2004 | Iijima et al. | |
| 2007/0027029 A1* | 2/2007 | Kasuya et al. | 502/180 |

FOREIGN PATENT DOCUMENTS

| | | |
|---|---|---|
| JP | 2002-083604 | 3/2002 |
| JP | 2002-326032 | 11/2002 |
| JP | 2004-152489 | 5/2004 |
| JP | 2006-052115 | 2/2006 |
| JP | 2007-007599 | 1/2007 |

OTHER PUBLICATIONS

International Search Report—PCT/JP2008/000031—Mar. 4, 2008.
Ayako Hashimoto et al.—Selective deposition of a gadolinium (III) cluster in a hole opening of single-wall carbon nanohorn—Proc. Natl. Acad. Sci. U.S.A.—2004—vol. 101—No. 23—pp. 8527-8530.

* cited by examiner

*Primary Examiner* — Patricia L Hailey
(74) *Attorney, Agent, or Firm* — Young & Thompson

(57) ABSTRACT

A carbon nanohorn (CNH) is oxidized to make an opening in the side of the CNH. A substance to be included, e.g., a metal, is introduced through the opening. The inclusion substance is moved to a tip part of the carbon nanohorn through heat treatment in vacuum or an inert gas. The CNH is further heat treated in an atmosphere containing oxygen in a low concentration to remove the carbon layer in the tip through catalysis of the inclusion substance. This exposes the inclusion substance. If the inclusion substance is a metal which is not moved to a tip part by the heat treatment in vacuum or an inert gas, the carbon part surrounding the fine catalyst particle is specifically burned by a heat treatment in an low oxygen concentration atmosphere, while utilizing the catalysis. Thus, the fine catalyst particle is fixed to the tip part of the CNH.

22 Claims, 5 Drawing Sheets

(a)

(b)

CATALYST-SUPPORTING CARBON NANOHORN COMPOSITE AND PROCESS FOR PRODUCING SAME

TECHNICAL FIELD

The present invention relates to a catalyst-supporting carbon nanohorn composite and a process for manufacturing thereof, and particularly relates to a catalyst-supporting carbon nanohorn composite, which locally carries fine particles of a catalyst in a tip section of a carbon nanohorn to allow enhanced dispersion, and a process for manufacturing thereof.

BACKGROUND ART

Carbon materials are conventionally utilized for catalyst carriers, adsorbents, separator agents, ink, toner or the like, and advents of nano-carbon materials having nano-sized dimensions such as carbon nanotube, carbon nanohorn and the like in recent years draw attentions for the characteristic thereof as the structural body, and studies for applications thereof are earnestly carried out.

In particular, characteristic structures of such carbon nanotube and carbon nanohorn attract attentions for industrial catalyst carriers, and for example, are described in the following Patent Literature 1 as one of the optimum catalyst carriers, and have been recently utilized for catalyst carriers of fuel cells.

Patent Literature 1; Japanese Patent Laid-Open No. 2004-152,489

DISCLOSURE OF THE INVENTION

Problems to be Solved by the Invention

It is generally known that a performance of a catalyst depends not only on physical properties of the carrier for supporting the catalyst metallic fine particles but also on mean particle size or particle size distribution of the metal supported thereon. Thus, in the conventional catalyst-supporting carbon nanohorn, catalyst fine particles are adherently supported on the surface of the carbon nanohorn. Catalyst components, which are supported to the carrier, are generally employed after being activated or stabilized by an annealing treatment or the like, and such treatment for the conventional catalyst-supporting carbon nanohorn may easily induce an agglomeration of the catalyst to cause a coarsening of the catalyst, causing a deterioration of the characteristics of the catalyst. Further, the fine particles of the catalyst on the carrier are easily moved in the conventional catalyst-supporting carbon nanohorn to cause an agglomeration and a coarsening of the fine particles of the catalyst (metallic particles) during the use, so that the catalyst characteristics are deteriorated in the long term use, causing a serious problems against the durability of the fuel cell. The object of the present invention is to solve the problems in the conventional technology as described above, and more specifically to achieve supporting catalyst fine particle on a carbon nanohorn in a highly dispersed condition and to prevent a move of fine particles of the catalyst on the surface of the carbon nanohorn to avoid an agglomeration and a coarsening of the fine particles of the catalyst, thereby allowing better catalyst characteristics being stably maintained for longer periods.

Means for Solving Problem

According to one aspect of the present invention, there is provided a catalyst-supporting carbon nanohorn composite, including a carbon nanohorn, and fine particles of the catalyst supported in the inside thereof, wherein open pores are formed in said carbon nanohorn, and wherein the fine particles of the catalyst are fitted into the open pores in a manner of being partially exposed outside of said carbon nanohorn.

According to another aspect of the present invention, there is provided a catalyst-supporting carbon nanohorn composite, including a carbon nanohorn, and fine particles of the catalyst supported in the inside thereof, wherein the fine particles of the catalyst are carried by a tip section of said carbon nanohorn in a manner of being partially exposed outside of said carbon nanohorn.

According to further aspect of the present invention, there is provided a process for manufacturing a catalyst-supporting carbon nanohorn composite, a carbon nanohorn supporting fine particles of a catalyst in an internal tip section, including: (11) forming open pores in the carbon nanohorn; (12) introducing the fine particles of a catalyst or a precursor thereof in the inside of the carbon nanohorn through the open pores; and (13) removing sections of the carbon nanohorn where the introduced fine particles of the catalyst or a precursor thereof are in contact with the carbon nanohorn to partially expose the fine particles of the catalyst or a precursor thereof outside of said carbon nanohorn.

According to yet other aspect of the present invention, there is provided a process for manufacturing a catalyst-supporting carbon nanohorn composite, a carbon nanohorn supporting fine particles of a catalyst in an internal tip section, including: (21) forming open pores in the carbon nanohorn; (22) introducing the fine particles of a catalyst or a precursor thereof in the inside of the carbon nanohorn through the open pores; and (23) moving the introduced fine particles of the catalyst or a precursor thereof from the periphery of the open pores to a tip section of the carbon nanohorn; and (24) removing sections of the carbon nanohorn where the moved fine particles of the catalyst or a precursor thereof are in contact with the carbon nanohorn to partially expose the fine particles of the catalyst or a precursor thereof outside of said carbon nanohorn.

ADVANTAGE OF THE INVENTION

According to the present invention, enhanced dispersion provided by supporting the fine particles of the catalyst in the tip section of the carbon nanohorn and reduced particle size and particle size monodispersity of the fine particles of the catalyst provided by the fact that the size of the fine particle of the catalyst is determined by the diameter of the open pore formed in the carbon nanohorn are achieved, so that highly reactive catalyst can be realized. In addition, since the fine particles of the catalyst is supported at a tip edge of a sheath of the carbon nanohorn, an agglomeration and a coarsening of the fine particles of the catalyst due to a thermal processing for activation or a long term use can be avoided, thereby allowing better catalyst characteristics being stably maintained for longer periods.

BRIEF DESCRIPTION OF THE DRAWINGS

The foregoing objects and other objects, features and advantages of the invention will be apparent from the following detailed description and annexed drawings.

It is a diagram, schematically illustrating a general outline of a process for producing a catalyst-supporting carbon nanohorn according to the present invention.

FIG. 2

It is a figure, showing an electron microscopy image of a carbon nanohorn employed in an Example of the present invention.

FIG. 3

It contains graphs, which show an adsorption-isotherm and a pore distribution, respectively, with nitrogen at 77 K for an oxidized-porous carbon nanohorn and a nanohorn without processing produced according to the present invention.

FIG. 4

It is a figure, showing an electron microscopy image of a gadolinium (Gd) metal-containing carbon nanohorn produced in Example 1 of the present invention.

FIG. 5

It is a graph, illustrating results of thermogravimetric analysis for an oxidized-porous carbon nanohorns and Gd metal-containing carbon nanohorns produced according to the present invention.

FIG. 6

It is a figure, showing an electron microscopy image of a Gd metal-containing carbon nanohorn produced in Example 1 of the present invention, in which Gd fine particles are moved to the tip section via a thermal processing within an argon (Ar) atmosphere at 1,200 degrees C.

FIG. 7

It is a figure, showing an electron microscopy image of platinum (Pt) fine particles produced in Example 2 of the present invention, which are supported in the tip section of the nanohorn via an oxidizing process with 1% oxygen.

BEST MODE FOR CARRYING OUT THE INVENTION

Figure 1:
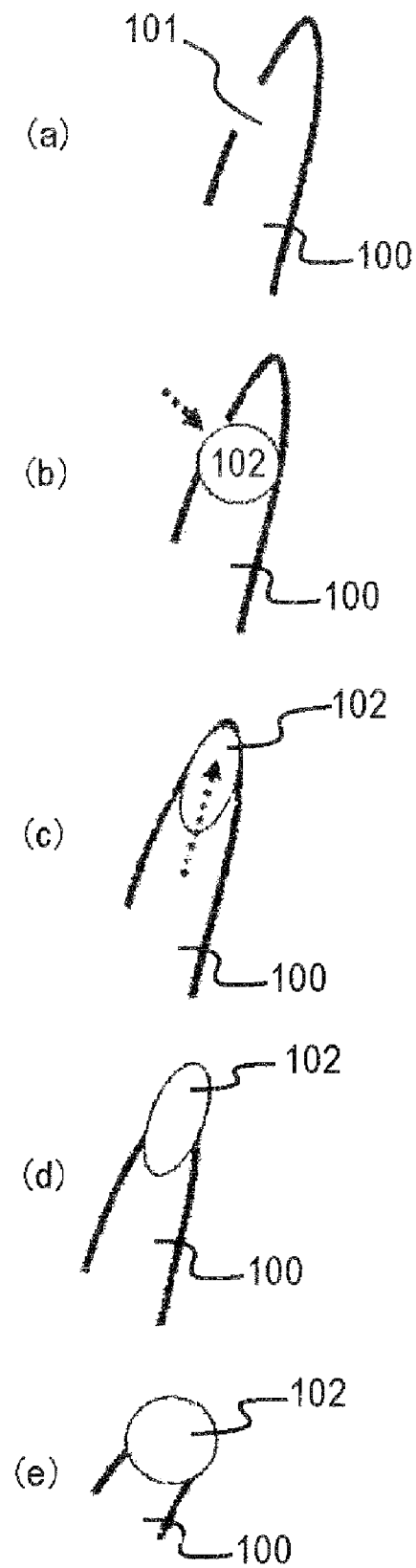
FIGS. 1(a) through 1(e)

Preferable embodiments of the present invention will be described as follows in reference to the annexed Drawings, from the following (1) to (4). FIG. 1 is a diagram, schematically illustrating a general outline of a process for producing a catalyst-supporting carbon nanohorn according to the present invention.

(1) Open pores are formed in a carbon nanohorn.

The process for manufacturing the carbon nanohorn composite according to the present invention first involves an oxidizing process for producing an oxidized-porous carbon nanohorn, as shown in FIG. 1(*a*). In such event, an open pore is created in a site containing five-membered ring and/or seven-membered ring in side surfaces of a carbon nanohorn 100 or the like to form an open pore section 101.

(2) A fine particle of a catalyst or a precursor thereof is introduced within a carbon nanohorn through the open pore.

Then, as indicated by an arrow in FIG. 1 (*b*), an inclusion substance 102 is taken in the inside of the carbon nanohorn from the open pore section 101. More specifically, the inclusion substance 102 is introduced in the inside of the carbon nanohorn 100 via a sublimation to be directly introduced in the inside thereof, or in the condition of being dissolved with a solvent. The inclusion substance 102 is a catalyst substance employing a metal such as Gd, Pt and the like or a precursor thereof.

(3) The introduced fine particle of the catalyst or a precursor thereof is moved from a peripheral of the open pore to a tip section of the carbon nanohorn.

Subsequently, as indicated by an arrow in FIG. 1 (*c*), the inclusion substance 102 is moved (provided that the substance is capable of moving, for example, in case of Gd) to the tip section of the carbon nanohorn via a thermal processing in the vacuum or within an inert gas.

(4) A section of the carbon nanohorn in the site that the moved fine particle of the catalyst or a precursor thereof is in contact with the carbon nanohorn is removed to partially expose the fine particle of the catalyst or a precursor thereof outside of the carbon nanohorn.

Further, a catalyst effect of the inclusion substance 102 is utilized via a thermal processing in an oxygen atmosphere at lower concentration to remove a carbon layer of the tip section of the carbon nanohorn 100, thereby exposing the surface of the inclusion substance 102 to the outside thereof (see FIG. 1(*d*)).

On the other hand, if the introduced fine particle of the catalyst or a precursor thereof is not movable, the fine particle of the catalyst or a precursor thereof is partially exposed outside of the carbon nanohorn by the following procedure.

A thermal processing in the vacuum or within an inert gas is conducted, so that, in the case of the inclusion substance 102 containing a metal that is not movable to the tip section (for example, in case of Pt), the peripheral carbon section covering the inclusion substance 102 (fine particle of the catalyst) is specifically burned within an oxygen at a concentration equal to or lower than 20% at a temperature within a range of from 200 degrees C. to 350 degrees by a catalytic action to immobilize the fine particle of the catalyst in the tip section of the carbon nanohorn 100. In such case, the periphery of the inclusion substance 102 is burned to burn a certain amount of the carbon nanohorn off, so that a sheath of the carbon nanohorn is shortened (see FIG. 1(*e*)).

Concerning the carbon nanohorn to be employed as a starting material, the nanohorns, each of which has a diameter of 2 nm to 5 nm, are aggregated in the attitude that a tip section of a honing-head is turned into the outside to form a spherical aggregate, and the available diameter of the aggregate may be within a range of from 30 nm to 150 nm. The size of the fine pore opening out in such carbon nanohorn can be controlled by various oxidizing conditions. In oxidizing conditions for the thermal processing within an atmosphere of oxygen gas, the temperature in the oxidizing process is suitably changed within a range of from 350 degrees C. to 550 degrees C. to create pores of a diameter of 0.3 nm to 1 nm, so that the size of the open pore of the carbon nanohorn can be controlled. In addition, as described in Japanese Patent Laid-Open No. 2003-95,624, an open pore may be created by a treatment with an acid. A use of nitric acid solution allows creating a pore of 1 nm at 110 degrees C. for 15 minutes, and a use of hydrogen peroxide allows creating a pore of 1 nm at 100 degrees C. for 2 hours. The conditions in creating the open pore are suitably controlled to provide different diameter of the open pore, so that an amount (size) of the inclusion substance taken within the carbon nanohorn can be controlled. As described later, an amount of the inclusion substance taken within the carbon nanohorn may also be controlled by suitably selecting the condition for taking the inclusion substance. As described above, the amount of the inclusion substance taken within the carbon nanohorn, so that the size of the fine particles of the catalyst supported by the carbon nanohorn can be controlled.

Then, a thermal processing in the vacuum or within an inert gas or a reducing atmosphere may be conducted to move the inclusion substance to the tip section of the carbon nanohorn to achieve a highly dispersed condition. In this case, the temperature for the thermal processing may be preferably a temperature within a range of from a room temperature to 1,800 degrees C. It is desirable that the temperature for heating is suitably controlled around a fusing point of the inclusion substance. In addition, some types of the inclusion substance may be moved to the tip section at an evaporating temperature of the inclusion substance. In such case, the use of the temperature of 1,800 degrees C. or lower may inhibit a graphitizing of the carbon nanohorn. Preferable inert gas includes nitrogen, argon and the like. The move may also be carried out while additionally reducing with hydrogen.

Suitable processing condition for removing the tip section of the carbon nanohorn including the catalyst may be a temperature within a range of from 200 degrees C. to 350 degrees C., and an oxygen gas atmosphere at a concentration of equal to or lower than 20%. In such case, the temperature of equal to or higher than 200 degrees C. is selected to allow utilizing a catalytic action of the inclusion substance to remove the carbon layer in the tip section. On the other hand, the temperature of equal to or lower than 350 degrees C. is selected to provide an increased dimension of the pore of the carbon nanohorn by oxidation, and to prevent a drop of the catalyst off the nanohorn due to an influence thereof. In addition, the use of the oxygen gas concentration of equal to or lower than 20% allows obtaining the similar effect as described above.

Alternatively, it is desirable to conduct the oxidizing process within a solution with an acid at a concentration of the oxidizing agent of equal to or lower than a 30% wt, at a room temperature to remove the tip section of the carbon nanohorn. Available oxidizing agents include, for example, sulfuric acid, nitric acid, hydrogen peroxide, potassium permanganate and the like. The concentration of the oxidizing agent may be controlled to be equal to or lower than 30% at a room temperature to inhibit the progress of the oxidation, and to inhibit the increase in the size of the pore of the carbon nanohorn by the progress of the oxidation and the dropping of the catalyst off the nanohorn.

While available substances for being included in the carbon nanohorn having the oxidized open pore are not particularly limited to any specific type of material, substances that is capable of sublimating in the vacuum or within an inert gas or capable of being dissolved in a solvent and existing in the solution during the introduction of the inclusion substance in the process for producing the catalyst-supporting carbon nanohorn composite of the present invention may be available. Provided that the substance is the type of the substance as described above, one of, or a mixture of two or more, materials selected from a group consisting of a metal, an inorganic compound and an organic compound. When a plurality of types of substances are contained, a chemical reaction of these substances may be caused to provide a targeted catalyst. In that event, the composition ratio of the catalyst substance may be controlled by suitably controlling the mixing ratio of a plurality of included substances. Alternatively, when a plurality of types of substances are contained, a plurality of types of catalyst substances may be supported by a single carbon nanohorn for the purpose of functioning the respective substances as different catalysts.

While the type of the inclusion substance available for the oxidized-porous carbon nanohorn is not particularly limited as described above, in particular, Pt, Au, Ag, Cu, Fe, Co, Ti, Cr, Ni and lanthanoids may be effective as metals, oxides of the above-described metals may be preferable as inorganic materials, and organic functional molecules such as fullerene, metal-include fullerenes dexamethasone (DEX), doxorubicin (DRX), tetrathiafulvalene (TTF), tetracyanoquinodimethane (TCNQ), or metallic complexes such as ferrocene, phthalocyanine, cisplatin and the like may be adopted as organic compounds. In the atmosphere employed for introducing these substances in gas phase, the pressure of equal to or lower than 1 atm may be preferable, and the size and the amount may be controlled by suitably controlling the introducing amount, the temperature and the duration time. The introducing amount may be preferably up to about 60% by weight ratio. The temperature for introducing the substances may be preferably within a range of from a room temperature to 3,000 degrees C., and the available duration time may be up to about 48 hours. In the processing within liquid phase, the type of the solvent or pH of the solution, concentration, temperature, duration time and the like may be suitably selected to control the size and the amount of the introduced substance. In such case, the available concentration may range up to the saturated concentration of each of the solvents, and the preferable temperature may range from a room temperature to about 300 degrees C., and the available duration time may range up to about 200 hours.

As described above, after the various types of inclusion substances are introduced, the thermal processing is conducted in the vacuum or within an inert gas or a reducing atmosphere to move the first-introduced inclusion substance to the tip section of the carbon nanohorn, and if the temperature in this time is within a range of from 800 degrees C. to 1,800 degrees C., the nano-sized open pore produced in the processing for creating the open pore can be closed.

Examples of the present invention will be described as follows, though it is not intended to limit the scope of the present invention to the following examples.

EXAMPLES

Example 1

In example 1, an acetic acid gadolinium-included carbon nanohorn was produced.
(Processing for Creating Open Pore in Carbon Nanohorn)

Figure 2:
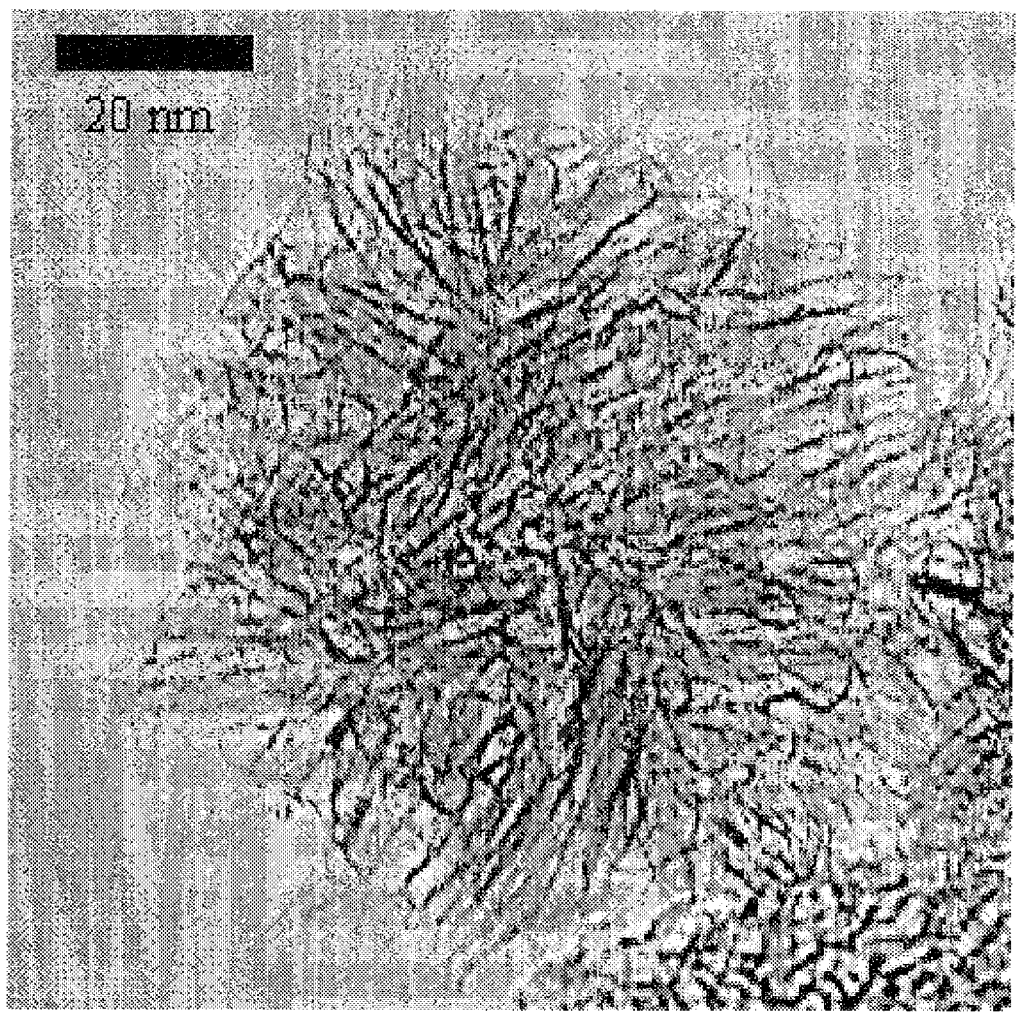
Figure 3:
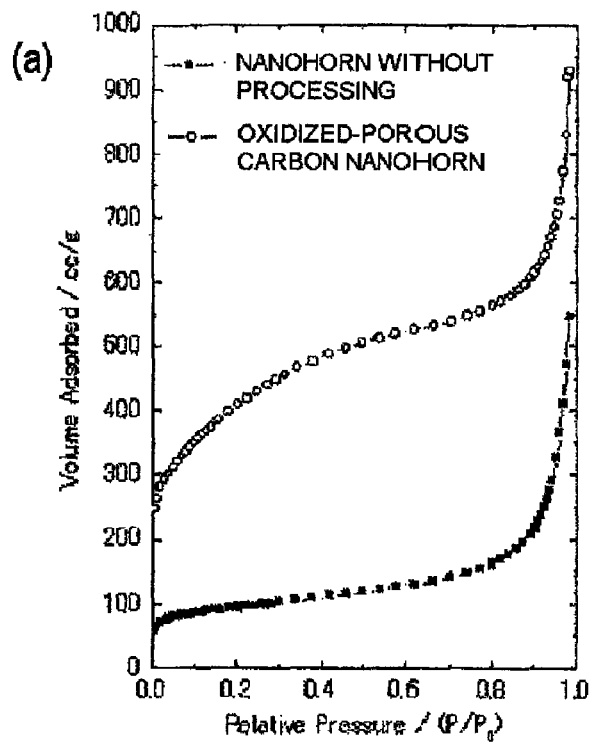
Figure 3:
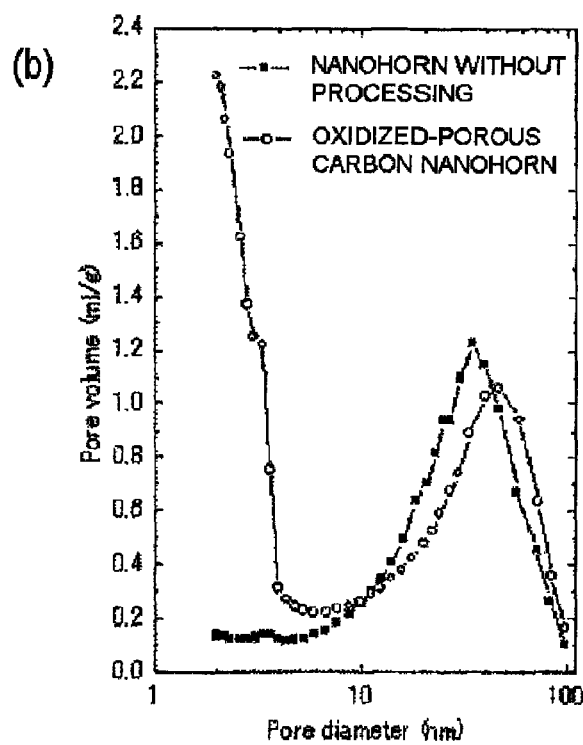

A thermal processing was conducted for a carbon nanohorn within an oxygen atmosphere of 1 atm at 550 degrees C. for 10 minutes. The oxygen flow rate in this case was 200 ml/min. Alternatively, the available oxygen pressure is may be equal to or lower than 1 atm. An image of a transmission electron microscope (TEM) of carbon nanohorns before the thermal processing is shown in FIG. 2. Then, nitrogen adsorption measurement at 77 K were carried out via a BET process for an oxidized-porous carbon nanohorn after a thermal processing and a nanohorn without processing obtained by the above-described process to evaluate specific surface areas and pore distributions. The results are shown in FIG. 3, In FIG. 3 (a), abscissa represents nitrogen partial pressure and ordinate represents absorbed amount, and in FIG. 3 (b), abscissa represents pore diameter and ordinate represents pore volume. As shown in FIG. 3, it was known from a significant increase in the specific surface area of the oxidized-porous carbon nanohorn and a significant increase in the volume of the pores having diameter of 2 to 3 nm shown in the pore distribution that a number of open pores were formed in the oxidized-porous carbon nanohorn.
(Introduction of Acetic Acid Gadolinium Salt into Oxidized-Porous Carbon Nanohorn)

Figure 4:
Figure 5:
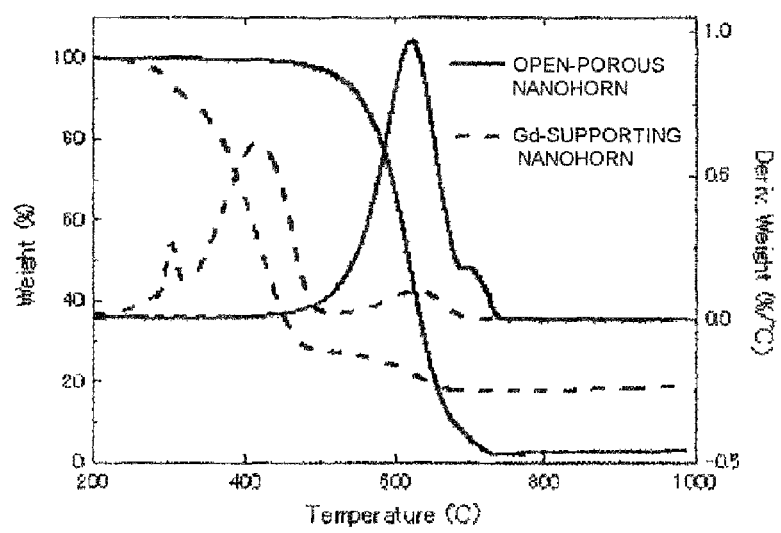

50 mg of acetic acid gadolinium salt and 50 mg of carbon nanohorn processed for creating open pores at 550 degrees C. were mixed within 20 ml of ethanol solution, and the mixture was stirred at a room temperature for about 24 hours. Then, a filter was used to conduct a filtration. Successively, a vacuum drying was carried out for 24 hours to evaporate the contained solvent and the like, thereby completely removing thereof. An image of a transmission electron microscope (TEM) of these samples is shown in FIG. 4. In FIG. 4, black points (see arrows in the figure) present acetic acid gadolinium salt, and thus it is found that these are contained in the inside of the oxidized-porous carbon nanohorns. Thermogravimetric analyses within an oxygen atmosphere were carried out for the oxidized-porous carbon nanohorns containing acetic acid gadolinium salt and the oxidized-porous carbon nanohorn without containing acetic acid gadolinium salt. The results are shown in FIG. 5. In FIG. 5, abscissa represents temperature, and ordinate represents weight and differential weight. Given the change of acetic acid gadolinium salt to gadolinium oxide via the thermal processing in the vacuum or within an inert gas, the content of the included acetic acid gadolinium salt was able to be estimated to be about 30% by weight ratio over the carbon nanohorn.

(Move of Acetic Acid Gadolinium Salt to Tip Section of Carbon Nanohorn)

Figure 6:
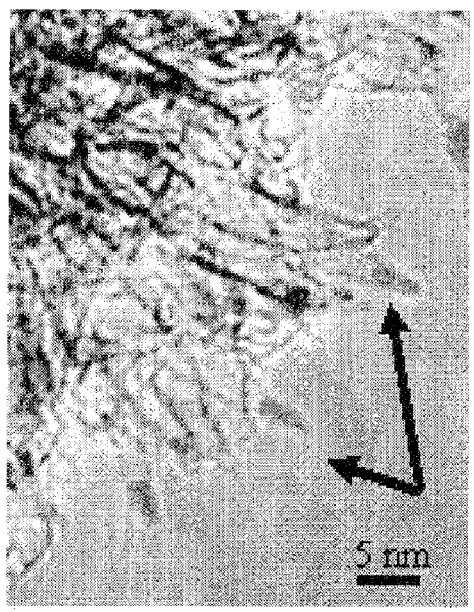

After acetic acid gadolinium salt was included in the oxidized-porous carbon nanohorn, a thermal processing was conducted with an electric furnace within an argon atmosphere at 1,200 degrees C. for 3 hours to move the metallic fine particles to the tip sections of the carbon nanohorns. A TEM image of the obtained substance is shown in FIG. 6. As indicated with arrows, black points represent gadolinium oxide, and are moved to the tip sections of the carbon nanohorn. The size of the fine particle is about 2 nm.

(Removal of Tip Section of Carbon Nanohorn by Combustion)

After the above-described processes, the supporting carbon nanohorns including the catalysts moved to the tip sections thereof was heated within a 1% oxygen (Ar 99%) at 250 degrees C. to cause selective combustion of the tip sections of the carbon nanohorns via catalytic action of the metal, thereby removing the carbon layer.

Example 2

In example 2, a Pt complex-included nanohorn was manufactured.

(Processing for Creating Open Hole in Carbon Nanohorn)

A process for creating open holes in carbon nanohorns and a process for causing inclusion of Pt complex (hexaammine platinum hydroxide) into the open hole nanohorns were carried out similarly as in Example 1. It was found that 30% of Pt complex was supported from results of the thermogravimetric analysis within the oxygen atmosphere.

(Support of Pt Complex to Tip Sections of Carbon Nanohorns)

Figure 7:
Figure 7:
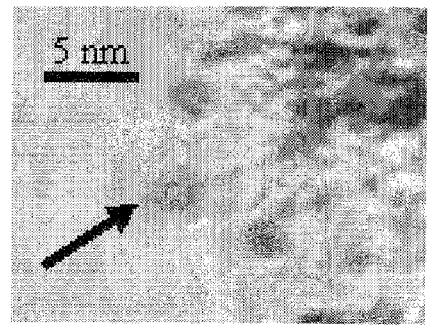

After Pt complex is included in the oxidized-porous carbon nanohorns, the carbon nanohorns were heated within a 1% oxygen (Ar 99%) at 250 degrees C. to burn the peripheral carbon layers by catalytic action of Pt, thereby immobilizing the catalyst fine particles in the tip sections (FIGS. 7 (a) and (b) show electron microscopy images of Pt fine particles supported in the tip sections of the nanohorns by oxidizing process with 1% oxygen produced in example 2 of the present invention). Since the carbon nanohorn was in the condition as shown in FIG. 1 (e) in such case, the periphery of the catalyst was combusted to burn a certain extent of the carbon nanohorn, reducing the dimension of the sheath, as compared with the technique of example 1. The Pt fine particles that look black is supported by the tip sections of the carbon nanohorns (see arrows in the figures). The size of Pt particle is about 2 nm.

Example 3

Evaluation on Catalyst Characteristics

Carbon nanohorn catalysts supporting Pt particles in the tip sections were produced by the technique of example 2, and a thermogravimetric analysis within an oxygen atmosphere was conducted to confirm that the support ratio was 30%. Further, a nanohorn without processing supporting Pt particles was produced in comparative example for comparison, and a thermogravimetric analysis was conducted to confirm that the support ratio was 30%.

The catalytic activities of the Pt catalysts produced in the present example were evaluated via a methanol oxidation reaction according to a technique of electrochemistry. The measurements were conducted with a standard tri-electrode cell. A working electrode was produced by applying nanohorn Pt catalyst over a carbon sheet, and a reference electrode was produced by employing Ag/AgCl, and a counter electrode was produced by employing platinum. An electrolytic solution was prepared to be 1M $CH_3OH$+0.5M $H_2SO_4$. Specific activity (A/g) in the condition of 0.5 V vs. RHE in such case is shown in table 1. Similar experiments were conducted for comparative example. In case of comparative example, the Pt catalysts were not located in the tip sections of the carbon nanohorn, but were generally supported on outer surfaces of sections of the carbon nanohorn about 10 to 20 nm further away from the tip sections. It was found from a comparison between two types of catalysts that specific activity of methanol oxidation for the catalyst supporting Pt particles in the tip sections with higher dispersion according to the present invention was increased at twice as that of the catalyst supported in the nanohorn without processing. Further, a comparison in the long-term storage within the vacuum at 150 degrees C. was conducted for two types of catalysts, while the Pt catalysts supported in the nanohorn without processing were gradually aggregated after 100 hours had passed, the size of the catalyst supporting Pt particles in the tip sections with higher dispersion according to the present invention was not substantially changed after 1,000 hours had been past.

TABLE 1

| | CARBON NANOHORN CATALYSTS SUPPORTING Pt FINE PARTICLES IN TIP SECTION | Pt CATALYSTS SUPPORTED IN TIP SECTION OF CARBON NANOHORN WITHOUT PROCESSING |
|---|---|---|
| SPECIFIC ACTIVITY OF METHANOL OXIDATION (A/g) (Pt, 0.5 V vs. RHE) | 20 | 10 |

Example 4

Control for Creating Open Pore in Carbon Nanohorn

Oxidizing processes were carried out for nanohorns without processed within a nitric acid solution at a concentration of 70% with different temperatures for the oxidizing process to control the size of the pore. Conditions for the oxidizing process were at temperatures of 25 degrees C. and 110 degrees C. for 15 minutes. After the oxidizing process, filtration processes with water were carried out for several times until the pH-value was around 5. The obtained samples were dried within the vacuum at 100 degrees C. for 24 hours. Nitrogen adsorption measurements at 77 K were conducted to provide comparisons among the nanohorn without processing, the carbon nanohorn with oxidizing-processed at 25 degrees C. and the carbon nanohorn with oxidizing-processed at 110 degrees C. The comparisons in the specific surface area via the BET process are shown in table 2. It is found from an increase in the specific surface area that nano-sized open pores were formed for both of the carbon nanohorn with oxidizing-processed at 25 degrees C. and the carbon nanohorn with oxidizing-processed at 110 degrees C.

TABLE 2

|  | CNH WITHOUT PROCESSING | CNH WITH OXIDIZING PROCESS AT 25° C. | CNH WITH OXIDIZING PROCESS AT 110° C. |
| --- | --- | --- | --- |
| BET SPECIFIC SURFACE AREA (mm$^2$/g) | 400 | 650 | 1300 |

In order to investigate the sizes of the opening pores, fullerene ($C_{60}$) was dispersed in toluene in these nanohorns with the opening pores, and then toluene was vaporized to include $C_{60}$ in the nanohorns with the opening pores. There were observed with the TEM. It was confirmed from the results that, while no $C_{60}$ is included in the carbon nanohorn (CNN) with oxidizing-processed at 25 degrees C., $C_{60}$ is included in the carbon nanohorn (CNH) with oxidizing-processed at 110 degrees C. It was found from the nitrogen adsorption measurement results and the TEM result that pores having sizes of equal to or larger than a size of nitrogen molecule (about 0.35 nm) and smaller than a size of $C_{60}$ molecule (about 0.9 nm) is formed in the carbon nanohorn (CNH) with oxidizing-processed at 25 degrees C., and pores having sizes of equal to or larger than about 0.9 nm is formed in the carbon nanohorn (CNH) with oxidizing-processed at 100 degrees C.

The invention claimed is:

1. A catalyst-supporting carbon nanohorn composite, comprising:
   a carbon nanohorn; and
   fine particles of the catalyst supported in an inside of the carbon nanohorn,
   wherein open pores are formed in said carbon nanohorn, and wherein the fine particles of the catalyst are fitted into the open pores in a manner of being partially exposed outside of said carbon nanohorn.

2. The catalyst-supporting carbon nanohorn composite as set forth in claim 1, including a carbon nanohorn, wherein the fine particles of the catalyst are carried by a tip section of said carbon nanohorn in a manner of being partially exposed outside of said carbon nanohorn.

3. A process for manufacturing a catalyst-supporting carbon nanohorn composite, a carbon nanohorn supporting fine particles of a catalyst in an internal tip section, comprising:
   (11) forming open pores in the carbon nanohorn;
   (12) introducing the fine particles of a catalyst or a precursor thereof in the inside of the carbon nanohorn through the open pores; and
   (13) removing sections of the carbon nanohorn where the introduced fine particles of the catalyst or a precursor thereof are in contact with the carbon nanohorn to partially expose the fine particles of the catalyst or a precursor thereof outside of said carbon nanohorn.

4. The process for manufacturing the catalyst-supporting carbon nanohorn composite as set forth in claim 3, wherein said (11) forming the open pores includes forming the open pores by thermally processing said carbon nanohorn within an atmosphere of oxygen gas, or forming the open pores by immersing said carbon nanohorn within a solution containing an oxidizing agent.

5. The process for manufacturing the catalyst-supporting carbon nanohorn composite as set forth in claim 4, wherein the size of the open pore is controlled by a temperature for the thermal processing within the atmosphere of oxygen gas or a type and a temperature of the oxidizing agent.

6. The process for manufacturing the catalyst-supporting carbon nanohorn composite as set forth in claim 5, wherein the temperature for thermally processing said carbon nanohorn is a temperature that provides closing of the open pores formed in said (21) forming the open pores.

7. The process for manufacturing the catalyst-supporting carbon nanohorn composite as set forth in claim 3, wherein said (13) removing sections of the carbon nanohorn includes carrying out a combustive removal for sections of the carbon nanohorn where the fine particles of the catalyst or a precursor thereof are in contact with the carbon nanohorn to partially expose the fine particles of the catalyst or a precursor thereof outside of said carbon nanohorn.

8. The process for manufacturing the catalyst-supporting carbon nanohorn composite as set forth in claim 7, wherein said combustive removal for the carbon nanohorn is carried out by a thermal processing within an atmosphere of oxygen at a concentration of equal to or lower than 20% at a temperature within a range from 200 degrees C. to 350 degrees C.

9. The process for manufacturing the catalyst-supporting carbon nanohorn composite as set forth in claim 3, wherein said (13) removing sections of the carbon nanohorn includes oxidizing said carbon nanohorn within an oxidizing solution containing an oxidizing agent at a concentration of equal to or less than a 30% wt. at a room temperature to partially expose the fine particles of the catalyst or a precursor thereof outside of said carbon nanohorn.

10. The process for manufacturing the catalyst-supporting carbon nanohorn composite as set forth in claim 3, wherein, in said (12) introducing the fine particles of the catalyst, the fine particles of the catalyst or a precursor thereof for introducing in said carbon nanohorn is one of, or a mixture of two or more, materials selected from a group consisting of a metal, an inorganic compound and an organic compound.

11. The process for manufacturing the catalyst-supporting carbon nanohorn composite as set forth in claim 10, wherein a composition ratio of the fine particles of the catalyst supported in the carbon nanohorn is controlled by controlling a mixing ratio of the mixture of the material introduced in said carbon nanohorn.

12. The process for manufacturing the catalyst-supporting carbon nanohorn composite as set forth in claim 3, wherein, in said (12) introducing the fine particles of the catalyst, a gaseous phase or a liquid phase is selected for an atmosphere for introducing the fine particles of the catalyst or a precursor thereof in said carbon nanohorn, and pH, concentration, temperature, and time are controlled to provide a controlled quantity of introduction in the carbon nanohorn.

13. The process for manufacturing the catalyst-supporting carbon nanohorn composite as set forth in claim 12, wherein the quantity of the introduction is controlled according to the size of the open pore formed in said (11) forming the open pores.

14. A process for manufacturing a catalyst-supporting carbon nanohorn composite, a carbon nanohorn supporting fine particles of a catalyst in an internal tip section, comprising:
   (21) forming open pores in the carbon nanohorn;
   (22) introducing the fine particles of a catalyst or a precursor thereof in the inside of the carbon nanohorn through the open pores;

(23) moving the introduced fine particles of the catalyst or a precursor thereof from the periphery of the open pores to a tip section of the carbon nanohorn; and

(24) removing sections of the carbon nanohorn where the moved fine particles of the catalyst or a precursor thereof are in contact with the carbon nanohorn to partially expose the fine particles of the catalyst or a precursor thereof outside of said carbon nanohorn.

15. The process for manufacturing the catalyst-supporting carbon nanohorn composite as set forth in claim 14, wherein said (23) moving the introduced fine particles includes moving the introduced fine particles of the catalyst or a precursor thereof thermally processing said carbon nanohorn within a vacuum, within an inert gas or within a reducing atmosphere at a temperature of within a range from a room temperature to 1,800 degrees C.

16. The process for manufacturing the catalyst-supporting carbon nanohorn composite as set forth in claim 14, wherein said (21) forming the open pores includes forming the open pores by thermally processing said carbon nanohorn within an atmosphere of oxygen gas, or forming the open pores by immersing said carbon nanohorn within a solution containing an oxidizing agent.

17. The process for manufacturing the catalyst-supporting carbon nanohorn composite as set forth in claim 16, wherein said (23) moving the introduced fine particles includes moving the introduced fine particles of the catalyst or a precursor thereof thermally processing said carbon nanohorn within a vacuum, within an inert gas or within a reducing atmosphere at a temperature of within a range from a room temperature to 1,800 degrees C.

18. The process for manufacturing the catalyst-supporting carbon nanohorn composite as set forth in claim 14, wherein said (24) removing sections of the carbon nanohorn includes carrying out a combustive removal for sections of the carbon nanohorn where the fine particles of the catalyst or a precursor thereof are in contact with the carbon nanohorn to partially expose the fine particles of the catalyst or a precursor thereof outside of said carbon nanohorn.

19. The process for manufacturing the catalyst-supporting carbon nanohorn composite as set forth in claim 14, wherein said (24) removing sections of the carbon nanohorn includes oxidizing said carbon nanohorn within an oxidizing solution containing an oxidizing agent at a concentration of equal to or less than a 30% wt. at a room temperature to partially expose the fine particles of the catalyst or a precursor thereof outside of said carbon nanohorn.

20. The process for manufacturing the catalyst-supporting carbon nanohorn composite as set forth in claim 14, wherein, in said (22) introducing the fine particles of the catalyst, the fine particles of the catalyst or a precursor thereof for introducing in said carbon nanohorn is one of, or a mixture of two or more, materials selected from a group consisting of a metal, an inorganic compound and an organic compound.

21. The process for manufacturing the catalyst-supporting carbon nanohorn composite as set forth in claim 14, wherein, in said (22) introducing the fine particles of the catalyst, a gaseous phase or a liquid phase is selected for an atmosphere for introducing the fine particles of the catalyst or a precursor thereof in said carbon nanohorn, and pH, concentration, temperature, and time are controlled to provide a controlled quantity of introduction in the carbon nanohorn.

22. The process for manufacturing the catalyst-supporting carbon nanohorn composite as set forth in claim 21, wherein the quantity of the introduction is controlled according to the size of the open pore formed in said (21) forming the open pores.

* * * * *